(12) United States Patent
Li et al.

(10) Patent No.: US 8,694,132 B2
(45) Date of Patent: *Apr. 8, 2014

(54) EXTREMUM SEEKING CONTROL WITH ACTUATOR SATURATION CONTROL

(75) Inventors: Yaoyu Li, Franklin, WI (US); John E. Seem, Glendale, WI (US)

(73) Assignee: Johnson Controls Technology Company, Holland, MI (US)

( * ) Notice: Subject to any disclaimer, the term of this patent is extended or adjusted under 35 U.S.C. 154(b) by 18 days.

This patent is subject to a terminal disclaimer.

(21) Appl. No.: 13/484,121

(22) Filed: May 30, 2012

(65) Prior Publication Data

US 2012/0239165 A1 Sep. 20, 2012

Related U.S. Application Data

(63) Continuation of application No. 12/683,883, filed on Jan. 7, 2010, now Pat. No. 8,200,345, which is a continuation of application No. PCT/US2008/070091, filed on Jul. 15, 2008.

(60) Provisional application No. 60/950,314, filed on Jul. 17, 2007.

(51) Int. Cl.
*G06F 19/00* (2011.01)

(52) U.S. Cl.
USPC ................. 700/38; 700/28; 700/300; 714/37

(58) Field of Classification Search
USPC .......... 700/28, 30–34, 276, 299–300; 714/37, 714/39
See application file for complete search history.

(56) References Cited

U.S. PATENT DOCUMENTS

| | | | |
|---|---|---|---|
| 2,812,141 A | 11/1957 | Sueda et al. |
| 3,181,791 A | 5/1965 | Axelrod |
| 4,026,251 A | 5/1977 | Schweitzer et al. |
| 4,114,807 A | 9/1978 | Naseck et al. |
| 4,182,180 A | 1/1980 | Mott |
| 4,199,101 A | 4/1980 | Bramow et al. |
| 4,257,238 A | 3/1981 | Kountz et al. |
| 4,319,461 A | 3/1982 | Shaw |
| 4,367,631 A | 1/1983 | Johnson et al. |
| 4,512,161 A | 4/1985 | Logan et al. |
| 4,558,595 A | 12/1985 | Kompelien |

(Continued)

FOREIGN PATENT DOCUMENTS

| | | | |
|---|---|---|---|
| JP | 63231127 A | 9/1988 |
| JP | 4062352 A | 2/1992 |

(Continued)

OTHER PUBLICATIONS

Office Action for U.S. Appl. No. 13/226,405, mail date Jun. 20, 2012, 9 pages.

(Continued)

*Primary Examiner* — Kavita Padmanabhan
*Assistant Examiner* — Douglas Lee
(74) *Attorney, Agent, or Firm* — Foley & Lardner LLP

(57) ABSTRACT

An extremum seeking control method optimizes a control process for a plant such as an air handling unit. The method improves the performance of an extremum seeking control strategy by limiting, removing or preventing the effects of an actuator saturation condition, particularly as the extremum seeking control strategy relates to HVAC applications.

15 Claims, 12 Drawing Sheets

(56) References Cited

U.S. PATENT DOCUMENTS

| | | | |
|---|---|---|---|
| 4,607,789 A | 8/1986 | Bowman | |
| 4,872,104 A | 10/1989 | Holsinger | |
| 4,876,858 A | 10/1989 | Shaw et al. | |
| 4,942,740 A | 7/1990 | Shaw et al. | |
| 5,251,814 A | 10/1993 | Warashina et al. | |
| 5,346,129 A | 9/1994 | Shah et al. | |
| 5,351,855 A | 10/1994 | Nelson et al. | |
| 5,355,305 A | 10/1994 | Seem et al. | |
| 5,414,640 A | 5/1995 | Seem | |
| 5,461,877 A | 10/1995 | Shaw et al. | |
| 5,467,287 A | 11/1995 | Wenner et al. | |
| 5,506,768 A | 4/1996 | Seem et al. | |
| 5,555,195 A | 9/1996 | Jensen et al. | |
| 5,568,377 A | 10/1996 | Seem et al. | |
| 5,590,830 A | 1/1997 | Kettler et al. | |
| 5,623,402 A | 4/1997 | Johnson | |
| 5,675,979 A | 10/1997 | Shah | |
| 5,682,329 A | 10/1997 | Seem et al. | |
| 5,746,061 A | 5/1998 | Kramer | |
| 5,769,315 A | 6/1998 | Drees | |
| 5,791,408 A | 8/1998 | Seem | |
| 5,867,384 A | 2/1999 | Drees et al. | |
| 6,006,142 A | 12/1999 | Seem et al. | |
| 6,098,010 A | 8/2000 | Krener et al. | |
| 6,115,713 A * | 9/2000 | Pascucci et al. | 1/1 |
| 6,118,186 A | 9/2000 | Scott et al. | |
| 6,122,605 A | 9/2000 | Drees et al. | |
| 6,161,764 A | 12/2000 | Jatnieks | |
| 6,219,590 B1 | 4/2001 | Bernaden, III et al. | |
| 6,223,544 B1 | 5/2001 | Seem | |
| 6,265,843 B1 | 7/2001 | West et al. | |
| 6,269,650 B1 | 8/2001 | Shaw | |
| 6,296,193 B1 | 10/2001 | West et al. | |
| 6,326,758 B1 * | 12/2001 | Discenzo | 318/609 |
| 6,369,716 B1 | 4/2002 | Abbas et al. | |
| 6,389,331 B1 | 5/2002 | Jensen et al. | |
| 6,408,228 B1 | 6/2002 | Seem et al. | |
| 6,415,617 B1 | 7/2002 | Seem | |
| 6,477,439 B1 | 11/2002 | Bernaden, III et al. | |
| 6,594,554 B1 | 7/2003 | Seem et al. | |
| 6,816,811 B2 | 11/2004 | Seem | |
| 6,862,540 B1 | 3/2005 | Welch et al. | |
| 6,937,909 B2 | 8/2005 | Seem | |
| 6,973,793 B2 | 12/2005 | Douglas et al. | |
| 7,031,880 B1 | 4/2006 | Seem et al. | |
| 7,050,873 B1 | 5/2006 | Discenzo | |
| 7,113,890 B2 | 9/2006 | Frerichs et al. | |
| 7,124,637 B2 | 10/2006 | Singhal et al. | |
| 7,169,039 B2 | 1/2007 | Oppedisano et al. | |
| 7,434,413 B2 | 10/2008 | Wruck | |
| 7,578,734 B2 | 8/2009 | Ahmed et al. | |
| 7,685,830 B2 | 3/2010 | Thybo et al. | |
| 7,827,813 B2 * | 11/2010 | Seem | 62/186 |
| 8,027,742 B2 | 9/2011 | Seem et al. | |
| 8,200,344 B2 | 6/2012 | Li et al. | |
| 8,200,345 B2 * | 6/2012 | Li et al. | 700/38 |
| 2003/0109963 A1 | 6/2003 | Oppedisano et al. | |
| 2004/0164690 A1 | 8/2004 | Degner et al. | |
| 2005/0006488 A1 | 1/2005 | Stanimirovic | |
| 2005/0040250 A1 | 2/2005 | Wruck | |
| 2006/0016201 A1 | 1/2006 | Kopel | |
| 2006/0090467 A1 | 5/2006 | Crow | |
| 2006/0259285 A1 | 11/2006 | Bahel et al. | |
| 2007/0023533 A1 | 2/2007 | Liu | |
| 2007/0191967 A1 | 8/2007 | Yo et al. | |
| 2008/0097651 A1 | 4/2008 | Shah et al. | |
| 2008/0179408 A1 * | 7/2008 | Seem | 236/49.3 |
| 2008/0179409 A1 | 7/2008 | Seem | |
| 2008/0277486 A1 | 11/2008 | Seem et al. | |
| 2009/0001179 A1 | 1/2009 | Dempsey | |
| 2009/0083583 A1 * | 3/2009 | Seem et al. | 714/39 |
| 2009/0099698 A1 | 4/2009 | Masui et al. | |
| 2009/0308941 A1 | 12/2009 | Patch | |
| 2010/0082161 A1 | 4/2010 | Patch | |
| 2010/0106328 A1 | 4/2010 | Li et al. | |
| 2010/0106331 A1 | 4/2010 | Li et al. | |
| 2012/0239166 A1 | 9/2012 | Li et al. | |

FOREIGN PATENT DOCUMENTS

| | | |
|---|---|---|
| JP | 10047738 A | 2/1998 |
| SU | 535103 A | 11/1976 |
| WO | WO 00/68744 A1 | 11/2000 |
| WO | WO 2009/012269 A2 | 1/2009 |
| WO | WO 2009/012282 A2 | 1/2009 |

OTHER PUBLICATIONS

Office Action for U.S. Appl. No. 13/484,131, mail date Aug. 6, 2012, 16 pages.
90.1 User's Manual, Energy Standard for Buildings Except Low-Rise Residential Buildings, ANSI/ASHRAE/IESNA Standard 90.1-2004, 7 pages.
Adetola et al., Adaptive Extremum-Seeking Receding Horizon Control of Nonlinear Systems, American Control Conference Proceedings, 2004, pp. 2937-2942.
Adetola et al., Adaptive output feedback extremum seeking receding horizon control of linear systems, ScienceDirect, Elsevier, Journal of Process Control, 2006, pp. 521-533, vol. 16.
Adetola et al., Parameter convergence in adaptive extremum-seeking control, ScienceDirect, Elsevier, automatica, available online Sep. 28, 2006, pp. 105-110, vol. 43.
Ariyur et al., Analysis and Design of Multivariable Extremum Seeking, Proceedings of the American Control Conference, Anchorage, Alaska, May 8-10, 2002, pp. 2903-2908.
Ariyur et al., Multivariable Extremum Seeking Feedback: Analysis and Design, pp. 1-15.
Ariyur et al., Real Time Optimization by Extremum Seeking Control, John Wiley & Sons, Oct. 2003, 230 pages.
Ariyur et al., Slope Seeking and Application to Compressor Instability Control, Proceeding of the 41st IEEE Conference on Decision and Control, Las Vegas, Nevada, Dec. 2002, pp. 3690-3697.
Ariyur et al., Slope seeking: a generalization of extremum seeking, International Journal of Adaptive Control and Signal Processing, 2004, pp. 1-22, vol. 18.
ASHRAE Standard, Energy Standard for Buildings Except Low-Rise Residential Buildings I-P Edition, ANSI/ASHRAE/IESNA Standard 90.1-2004, 4 pages.
Astrom et al., Optimizing Control, Adaptive Control Second Edition, 1995, pp. 214-230, Addison-Wesley Publishing Company, USA.
Banaszuk et al., Adaptive Control of Combustion Instability Using Extremum-Seeking, Proceedings of the American Control Conference, Chicago, Illinois, Jun. 2000, pp. 416-422.
Banavar et al., Functional Feedback in an Extremum Seeking Loop, Proceedings of the 40th IEEE Conference on Decision and Control, Orlando, Florida, Dec. 2001, pp. 1316-1321, 8 pages.
Banavar, R.N., Extremum seeking loops with quadratic functions: estimation and control, International Journal of Control, 2003, pp. 1475-1482, vol. 76, No. 14.
Beaudoin et al., Bluff-body drag reduction by extremum-seeking control, Journal of Fluids and Structures, 2006, pp. 973-978, vol. 22.
Binetti et al., Control of Formation Flight via Extremum Seeking, Proceedings of the American Control Conference, Anchorage, Alaska, May 8-10, 2002, pp. 2848-2853.
Blackman, P.F., Extremum-Seeking Regulators, An Exposition of Adaptive Control, Pergamon Press, 1962, 17 pages.
Cowan, Review of Recent Commercial Roof Top Unit Field Studies in the Pacific Northwest and California, report for Northwest Power and Conservation Council and Regional Technical Forum, Oct. 8, 2004, 18 pages.
DOE Federal Emergency Management Program, Actions You Can Take to Reduce Cooling Costs, taken from http://www1.eere.energy.gov/femp/pdfs/om_cooling.pdf, believed to be available May 2005, 8 pages.

(56) References Cited

OTHER PUBLICATIONS

Drakunov et al., ABS Control Using Optimum Search via Sliding Modes, IEEE Transactions on Control Systems Technology, Mar. 1995, pp. 79-85, vol. 3, No. 1.
Financial Times Energy, Inc. Economizers, Energy Design Resources, taken from http://www.energydesignresources.com/resource/28/, believed to be available by at least Jan. 2007, 30 pages.
Guay et al., Adaptive extremum seeking control of nonlinear dynamic systems with parametric uncertainities, ScienceDiet, Pergamon, Automatica, 2003, pp. 1283-1293.
Killingsworth et La., PID Turning Using Extremum Seeking, IEEE Control Systems Magazine, Feb. 2006, pp. 70-79.
Krstic et al., Stability of extremum seeking feedback for general nonlinear dynamic systems, Automatica, Mar. 1997, vol. 36, pp. 595-601.
Krstic, Miroslav, Extremum Seeking Control for Discrete-Time Systems; IEEE Transactions on Automatic Control, University of California Postprints, 2002, pp. 318-323, 8 pages.
Krstic, Miroslav, Performance improvement and limitations in extremum seeking control, Dec. 1998, pp. 313-326, Department of Mechanical and Aerospace Engineering, University of California, San Diego, La Jolla, CA, USA.
Larsson, Stefan, Literature Study on Extremum Control, Control and Automation Laboratory, Nov. 2001, pp. 1-14, Department of Signals and Systems, Chalmers University of Technology.
Leblanc, M. Sur l'electrification des Chemins de fer au Moyen de Courants Alternatifs de Frequence Elevee, Revue Generale de l'Electricite, 1922, 4 pages.
Leyva et al., MPPT of Photovoltaic Systems using Extremum-Seeking Control, IEEE Transactions on Aerospace and Electronic Systems, Jan. 2006, vol. 42, No. 1, pp. 249-258.
Li et al., Extremum Seeking Control of a Tunable Thermoacoustic Cooler, IEEE Transactions on Control Systems Technology, pp. 527-536, vol. 13, No. 4., Jul. 2005, pp. 527-536.
Liu et al., Extremum-seeking with variable gain control for intensifying biogas production in anaerobic fermentation, Water Science & Technology, 2006, vol. 53, No. 4-5, pp. 35-44.
Marcos et al., Adaptive extremum-seeking control of a continuous stirred tank bioreactor with Haldane's Kinetics, Journal of Process Control, 2004, vol. 14, pp. 317-328.
Pan et al., Discrete-Time Extremum Seeking Algorithms, Proceedings of American Control Conference, Anchorage, Alaska, May 2002, pp. 3753-3758, 8 pages.
Popovic et al., Extremum seeking methods for optimzation of variable cam timing engine operation, Proceedings of the American Control Conference, Jun. 4-6, 2003, Denver, CO, USA, pp. 3136-3141.
Rotea, Analysis of Multivariable Extremum Seeking Algorithms, Proceedings of the American Control Conference, pp. 433-437, Jun. 2000, Chicago, IL, USA.
Salsbury, A Controller for HVAC Systems with Embedded Fault Detection Capabilities Based on Simulation Models, presented at the International Building Simulation Conference in Kyoto, Japan, Sep. 1999, 8 pages.
Sane et al., Building HVAC Control Systems—Role of Controls and Optimization, Proceedings of the American Control Conference Minneapolis, Minnesota, Jun. 14-16, 2006, 6 pages.
Speyer et al., Extremum Seeking Loops with Assumed Functions, Proceedings of the 39th IEEE Conference on Decision and Control, Sydney, Australia, Dec. 2000, pp. 142-147, 8 pages.
Sternby, Extremum Control Systems—An Area for Adaptive Control?, 12 pages, Department of Automatic Control, Lund Institute of Technology, Lund, Sweden.
Teel et al., Solving Smooth and Nonsmooth Multivariable Extremum Seeking Problems by the Methods of Nonlinear Programming, Proceedings of American Control Conference, Arlington, Virgina, Jun. 2001, pp. 2394-2399, 8 pages.
Teel, A.R., Lyapunov Methods in Nonsmooth Optimization, Part I: Quasi-Newton Algorithms for Lipschitz, Regular Functions, Proceedings of the 39th IEEE Conference on Decision and Control, Sydney, Australia, Dec. 2000, pp. 112-117, 8 pages.
Teel, A.R., Lyapunov Methods in Nonsmooth Optimization, Part II: Persistenly Exciting Finite Differences, Proceedings of the 39th IEEE Conference on Decision and Control, Sydney, Australia, Dec. 2000, pp. 118-123, 8 pages.
Titica et al., Adaptive Extremum Seeking Control of Fed-Batch Bioreactors, European Journal of Control, vol. 9, 2003, pp. 618-631.
Tsien, H.S., Engineering Cybernetics, McGraw-Hill Book Company, Inc., 1954, 298 pages.
Tunay, I., Antiskid Control for Aircraft via Etremum-Seeking, Proceedings of American Control Conference, Arlington, Virgina, Jun. 2001, pp. 665-670, 8 pages.
Walsh, On the Application of Multi-Parameter Extremum Seeking Control, Proceedings of the American Control Conference, pp. 411-415, Jun. 2000, Chicago, IL, USA.
Wang et al., Experimental Application of Extremum Seeking on an Axial-Flow Compressor, IEEE Transactions on Control Systems Technology, Mar. 2000, vol. 8, No. 2, pp. 300-309.
Wang et al., Extremum Seeking for Limit Cycle Minimization, IEEE Transactions on Automatic Control, Dec. 2000, vol. 45, No. 12, pp. 2432-2437.
Wang et al., Optimizing Bioreactors by Extremum Seeking, International Journal of Adaptive Control and Signal Processing, 1999, pp. 651-669.
Yu et al., Extremum-Seeking Control Strategy for ABS System with Time Delay, Proceedings of American Control Conference, Anchorage, Alaska, May 2002, pp. 3753-3758, 8 pages.
Yu et al., Extremum-Seeking Control via Sliding Mode with Periodic Search Signals, Proceedings of the 41st IEEE Conference on Decision and Control, Las Vegas, Nevada, Dec. 2002, pp. 323-328, pages.
Zhang et al., Extremum-Seeking Nonlinear Controllers for a Human Exercise Machine, IEEE/ASME Transactions on Mechatronics, Apr. 2006, vol. 11, No. 2, pp. 233-240.
Zhang, Y., Stability and Performance Tradeoff with Discrete Time Triangular Search Minimum Seeking, Proceedings of American Control Conference, Chicago, Illinois, Jun. 2000, pp. 423-427, 7 pages.
Office Action for U.S. Appl. No. 11/699,859, mail date Mar. 15, 2010, 12 pages.
Office Action for U.S. Appl. No. 11/699,859, mail date Aug. 31, 2010, 6 pages.
Office Action for U.S. Appl. No. 11/699,860, mail date Jun. 9, 2010, 9 pages.
Office Action for U.S. Appl. No. 11/699,860, mail date Aug. 20, 2009, 18 pages.
Office Action for U.S. Appl. No. 12/323,293, mail date Feb. 3, 2011, 10 pages.
Office Action for U.S. Appl. No. 12/650,366, mail date Oct. 20, 2011, 18 pages.
Office Action for U.S. Appl. No. 12/683,883, mail date Sep. 19, 2011, 7 pages.
Examination Report for G.B. Patent Application No. 1000634.4, mailed Aug. 30, 2011, 2 pages.
Office Action for German Application No. 112008001836.7, mail date Apr. 17, 2012, 12 pages.
Office Action for German Application No. 112008001872.3, mail date Apr. 2, 2012, 10 pages.
International Search Report and Written Opinion for International Patent Application No. PCT/US2008/070091, mailed Sep. 30, 2009, 13 pages.
International Search Report and Written Opinion for International Patent Application No. PCT/US2008/070118, mailed Oct. 19, 2009, 11 pages.
Office Action for U.S. Appl. No. 12/938,203, mail date Oct. 2, 2012, 9 pages.
Office Action for U.S. Appl. No. 13/325,971, mail date Dec. 18, 2012, 12 pages.

* cited by examiner

EXTREMUM SEEKING CONTROL WITH ACTUATOR SATURATION CONTROL

CROSS REFERENCE TO RELATED APPLICATIONS

This is a continuation of U.S. patent application Ser. No. 12/683,883, filed Jan. 7, 2010, which is a continuation of PCT Application No. PCT/US2008/070091, filed Jul. 15, 2008, which claims the benefit of U.S. Provisional Application No. 60/950,314, filed Jul. 17, 2007. This application hereby expressly incorporates by reference the entirety of: U.S. patent application Ser. No. 12/683,883, filed Jan. 7, 2010, PCT Application No. PCT/US2008/070091, filed Jul. 15, 2008, U.S. Provisional Application No. 60/950,314, filed Jul. 17, 2007, U.S. patent application Ser. No. 11/699,859, filed Jan. 30, 2007, and U.S. patent application Ser. No. 11/699,860, filed Jan. 30, 2007.

BACKGROUND

The present application generally relates to extremum seeking control strategies. The present application more particularly relates to regulating, via extremum seeking control, the amount of air that is flowing through a heating, ventilation and air conditioning (HVAC) system in order to reduce the amount of mechanical heating and cooling required within an air-handling unit (AHU).

Extremum seeking control (ESC) is a class of self-optimizing control strategies that can dynamically search for the unknown and/or time-varying inputs of a system for optimizing a certain performance index. It can be considered a dynamic realization of gradient searching through the use of dithering signals. The gradient of the system output with respect to the system input is typically obtained by slightly perturbing the system operation and applying a demodulation measure. Optimization of system performance can be obtained by driving the gradient towards zero by using an integrator in the closed-loop system. ESC is a non-model based control strategy, meaning that a model for the controlled system is not necessary for ESC to optimize the system.

Typical ESCs utilize a closed-loop configuration in which a gradient is calculated between the inputs to a plant and system performance. An integrator is then used in the closed-loop system to drive the gradient to zero. A detrimental phenomenon known as "integrator windup" may occur if the determined optimal reference point for the system is mathematically outside of the operating range for the actuator, causing the optimal settings for the actuator to correspond to an operating boundary. When the actuator cannot move to the optimal setting determined by the ESC loop, a condition known as actuator saturation is said to exist. For example, the optimal power consumption for an AHU utilizing an extremum seeking controller may correspond to a damper opening of less than 0%, a physical impossibility. When an actuator saturation condition exists, the integrator output will continue to grow until the sign of the input to the integrator changes.

SUMMARY

The invention relates to a method for optimizing a control process for an actuator. The method includes operating the control process using an extremum seeking control strategy. The method further includes using an electronic circuit to compensate for an actuator saturation condition of the extremum seeking control strategy.

The invention also relates to a controller for controlling an actuator. The controller includes a processing circuit configured to operate the plant using an extremum seeking control strategy. The processing circuit is further configured to compensate for an actuator saturation condition of the extremum seeking control strategy.

The invention further relates to a controller configured for use with an air handling unit having a temperature regulator and a damper affected by an actuator. The controller includes a processing circuit configured to provide a first control signal to the temperature regulator, the first control signal being based upon a setpoint. The processing circuit is further configured to provide a second control signal to the actuator, the second control signal being determined by an extremum seeking control loop. The processing circuit is yet further configured to adjust the extremum seeking control loop to compensate for an actuator saturation condition.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, a controller is configured to control a plant having an actuator using an extremum seeking control strategy. The extremum seeking control strategy is configured to compensate for the effects of an actuator saturation condition.

Figure 1:
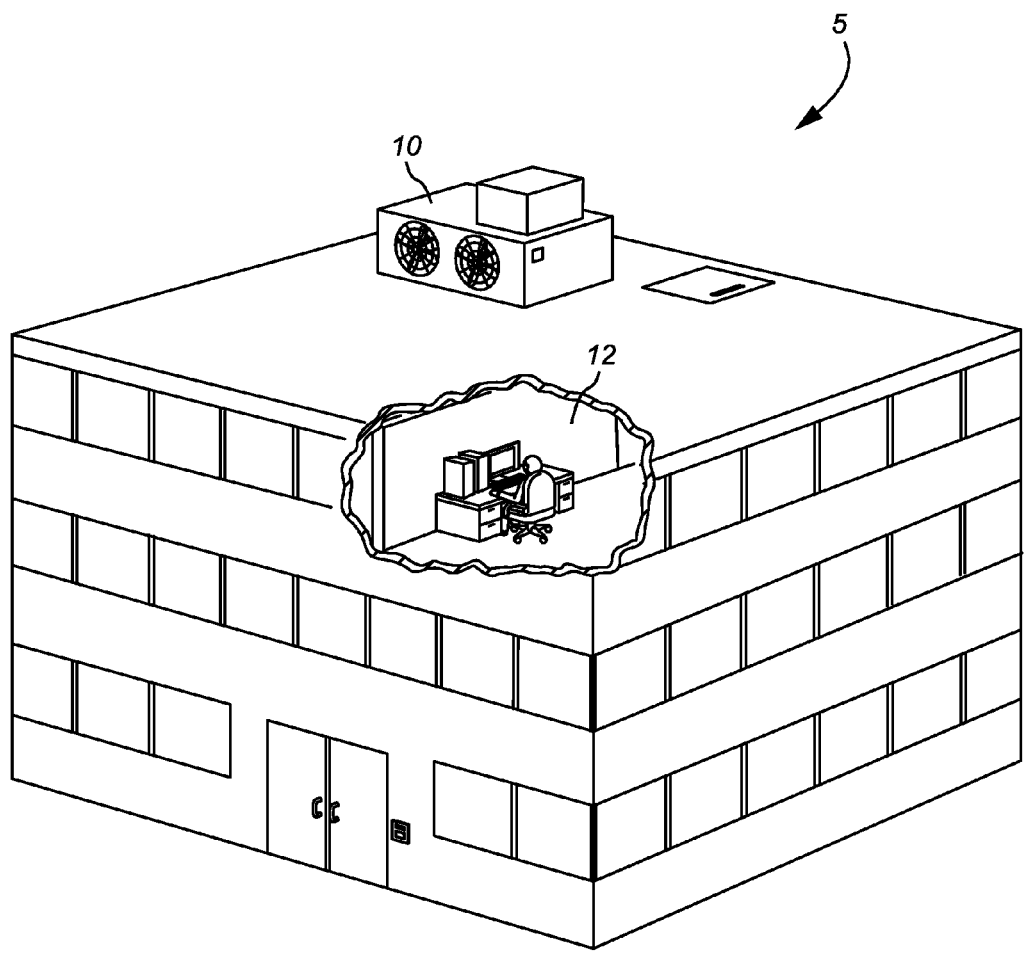
FIG. 1 is a perspective view of a building with an HVAC system, according to an exemplary embodiment.

FIG. 1 is a perspective view of a building 5 with an HVAC system, according to an exemplary embodiment. As illustrated, building 5 has an air handling unit (AHU) 10. AHU 10 is part of an HVAC system and is used to condition, chill, heat, and/or control the environment of a room 12 in building 5. The control system for AHU 10 utilizes extremum seeking to provide economizer functionality by optimizing the flow of outdoor air into AHU 10 in order to minimize the power consumption of AHU 10. According to various other exemplary embodiments, building 5 may contain more AHUs. Each AHU may be assigned a zone (e.g., room 12, a set of rooms, part of a room, floor, set of floors, part of a floor, etc.) of building 5 that the AHU is configured to affect (e.g., condition, cool, heat, ventilate, etc.). Each zone assigned to an AHU may be further subdivided through the use of variable air volume boxes or other HVAC configurations.

Figure 2:
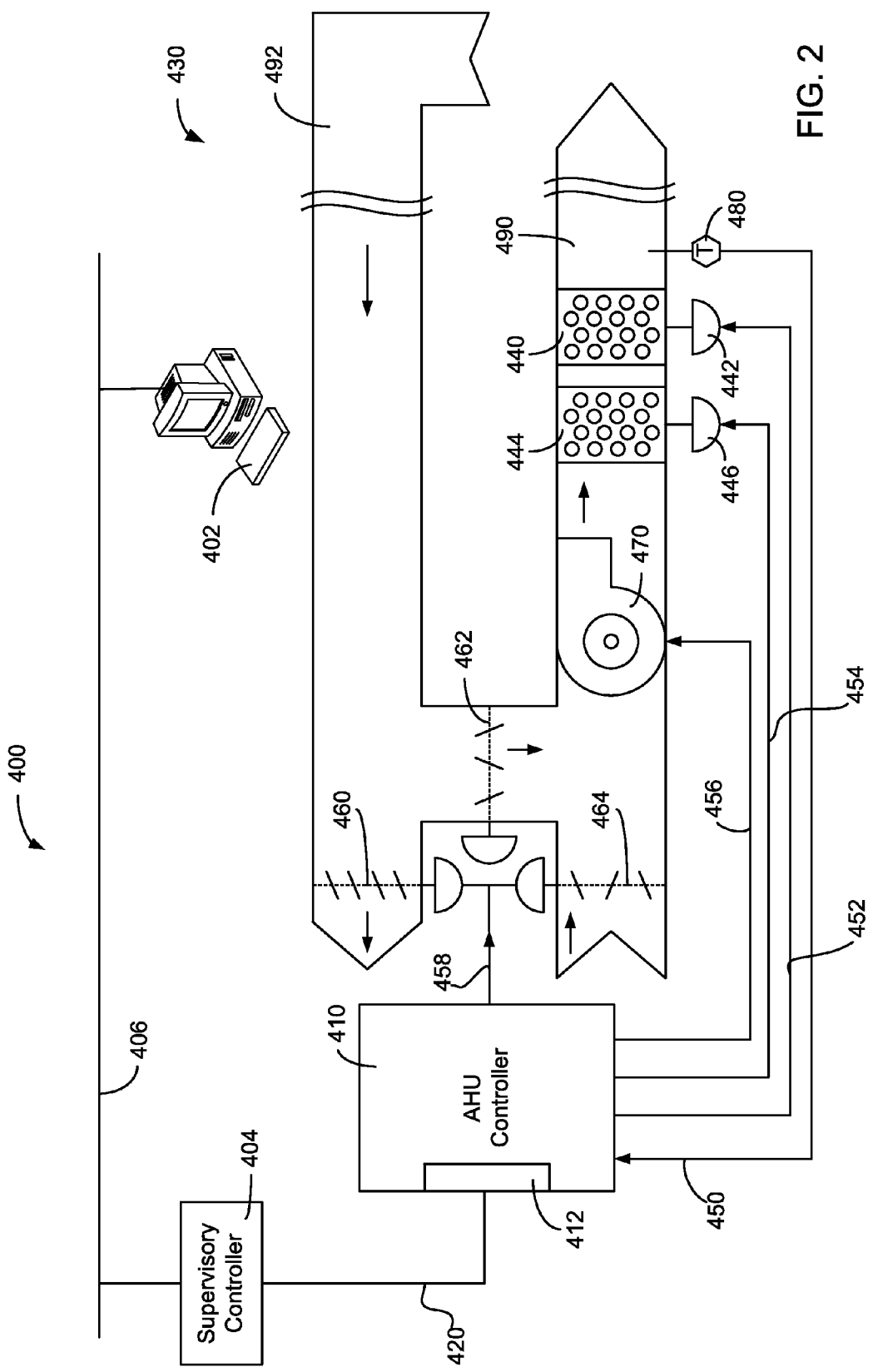
FIG. 2 is a schematic diagram of an environmental control system having an AHU, according to an exemplary embodiment.

Referring now to FIG. 2, a schematic diagram of an environmental control system 400 having an AHU 430 is shown, according to an exemplary embodiment. Environment control system 400 includes a workstation 402, a supervisory controller 404 (e.g., a network automation engine (NAE)), and an AHU controller 410 which utilizes extremum seeking, according to an exemplary embodiment. AHU controller 410 is coupled to supervisory controller 404 via communications link 420. Workstation 402 and supervisory controller 404 are coupled via a communications bus 406. Communications bus 406 may be coupled to additional sections or additional controllers, as well as other components utilized in environment control system 400. Environment control system 400 may be a building automation system such as a METASYS brand system manufactured by Johnson Controls, Inc. According to other exemplary embodiments, system 400 may be a unitary system having an AHU or another damper system.

In an exemplary embodiment, controller 410 is operatively associated with a controlled air handling unit such as AHU 430. Controller 410 is configured to operate as a finite state machine with the three states depicted in FIG. 3, wherein AHU 430 uses extremum seeking logic when in state 503. A transition occurs from one state to another, as indicated by the arrows, when a specified condition or set of conditions occurs. In an exemplary embodiment, the operational data of AHU 430 is checked when controller 410 is in a given state to determine whether a defined transition condition exists. A transition condition is a function of the present state and may also refer to a specific time interval, temperature condition, supply air condition and/or return air condition.

In an exemplary embodiment, a transition condition occurs when controller 410 remains in a given operating mode for a predetermined period of time without adequately providing an output corresponding to a setpoint provided to the controller 410 by the supervisory controller 404. For example, a transition condition occurs in a mechanical cooling mode when the system is unable to provide an output of air at the desired temperature within a reasonable amount of time.

In state 501, valve 442 for heating coil 440 is controlled to modulate the flow of hot water, steam, or electricity to heating coil 440, thereby controlling the amount of energy transferred to the air. This maintains the supply air temperature at the setpoint. Dampers 460, 462, and 464 are positioned for a minimum flow rate of outdoor air and there is no mechanical cooling, (i.e. chilled water valve 446 is closed). The minimum flow rate of outdoor air is the least amount required for satisfactory ventilation to the supply duct 490. For example, 20% of the air supplied to duct 490 is outdoor air. The condition for a transition to state 502 is defined by the heating control signal remaining in the "No Heat Mode." Such a mode occurs when valve 442 of heating coil 440 remains closed for a defined period of time (i.e. heating of the supply air is not required during that period). This transition condition can result from the outdoor temperature rising to a point at which the air from the supply duct 490 does not need mechanical heating.

In state 502, dampers 460, 462, and 464 alone are used to control the supply air temperature in supply duct 490 (i.e. no mechanical heating or cooling). In this state the amount of outdoor air that is mixed with the return air from return duct 492 is regulated to heat or cool the air being supplied via supply duct 490. Because there is no heating or mechanical cooling, the inability to achieve the setpoint temperature results in a transition to either state 501 or 503. A transition occurs to state 501 for mechanical heating when either for a defined period of time the flow of outdoor air is less than that required for proper ventilation or outdoor air inlet damper 464 remains in the minimum open position for a given period of time. The finite state machine makes a transition from state 502 to state 503 for mechanical cooling upon the damper control remaining in the maximum outdoor air position (e.g. 100% of the air supplied by the AHU is outdoor air) for a period of time.

In state 503, chilled water valve 446 for cooling coil 444 is controlled to modulate the flow of chilled water and control the amount of energy removed from the air. At this time, extremum seeking control is used to modulate dampers 460, 462, and 464 to introduce an optimal amount of outdoor air into AHU 430. In an exemplary embodiment, a transition occurs to state 502 when the mechanical cooling does not occur for the given period of time (i.e. the cooling control is saturated in the no-cooling mode).

Figure 3:
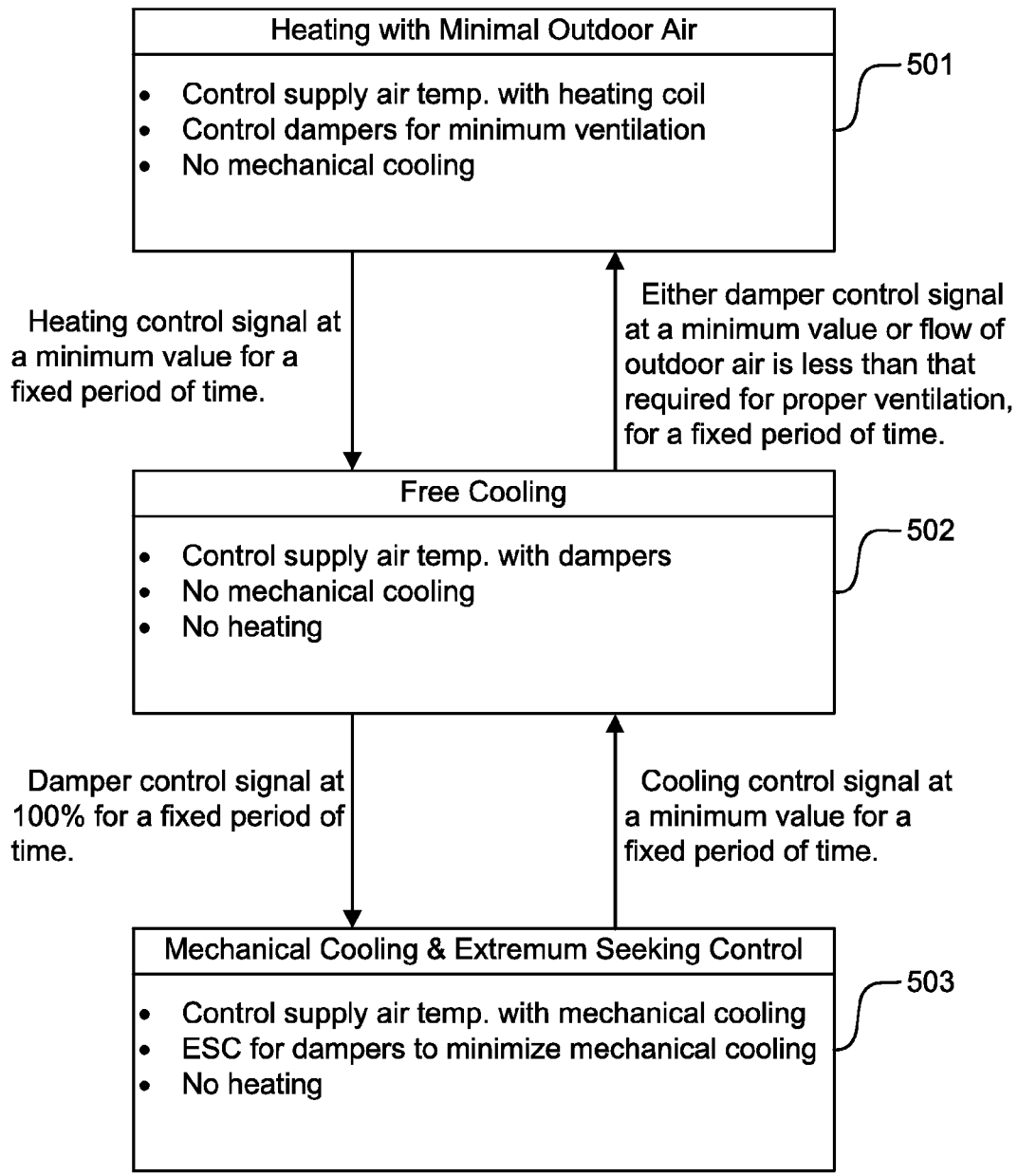
FIG. 3 is a state diagram of an AHU utilizing an extremum seeking control strategy, according to an exemplary embodiment.

Referring further to FIG. 3, in state 501, heating with minimum outdoor air required for ventilation is initiated. In cold climates, the initial state of control is a heating with minimum outdoor air state 501. The system initiates in state 501 to minimize the potential that cooling coil 444 and heating coil 440 could freeze. State 501 controls the supply air temperature by modulating the amount of heat supplied from heating coil 440. Dampers 460, 462, and 464 are controlled for minimum ventilation. In an exemplary embodiment, a transition to state 502 occurs after the heating control signal has been at its minimum value (no-heat position) for a fixed period of time.

In state 502, the system is utilizing outdoor air to provide free cooling to the system. State 502 controls the supply air temperature by modulating dampers 460, 462, and 464 to adjust the mixing of outdoor air with return air. In an exemplary embodiment, a transition to state 501 occurs after dampers 460, 462, and 464 have been at a minimum ventilation requirement for a fixed period of time or the damper control signal is at a minimum value for a fixed period of time. In an exemplary embodiment, a transition to state 503 occurs after dampers 460, 462, and 464 have been controlled to supply 100% outdoor air for a fixed period of time.

In state 503, the system utilizes mechanical cooling with an extremum seeking control strategy to control dampers 460, 462, and 464. State 503 controls the supply air temperature by modulating the flow rate of chilled water or refrigerant through cooling coil 444. An extremum seeking control strategy is used to determine the positions of dampers 460, 462, and 464 to minimize the amount of mechanical cooling required. An actuator saturation condition may occur using a standard extremum seeking control strategy if the optimum damper opening for a damper corresponds to a physical boundary on the operation of the damper. Controller 410 has been adapted to limit the detrimental effects of an actuator saturation condition. Ventilation requirements are set at a lower limit for the amount of outside air in supply duct 490. In an exemplary embodiment, a transition to state 502 occurs after the control signal for cooling has been in the no-cooling command mode for a fixed period of time.

Figure 4A:
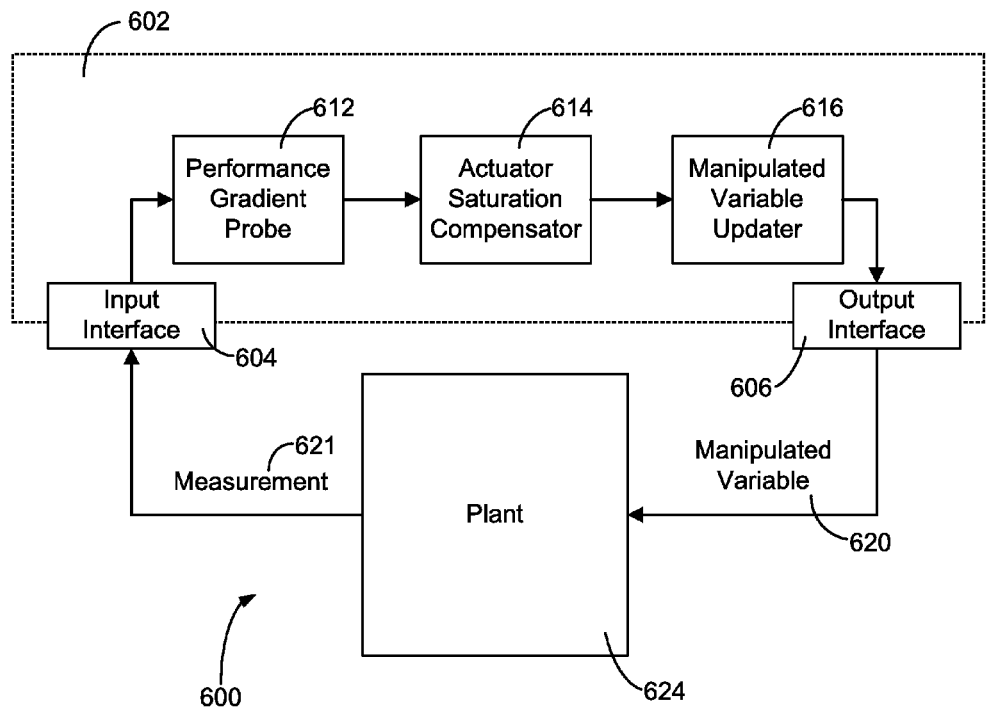
FIG. 4A is a block diagram of an extremum seeking control loop configured to limit the effects of an actuator saturation condition, according to an exemplary embodiment.

Referring to FIG. 4A, a block diagram of an ESC loop 600 that compensates for an actuator saturation condition is shown, according to an exemplary embodiment. A controller 602 having extremum seeking control logic continually modifies its output in response to changing measurement 621 received from plant 624 via input interface 604. A plant in control theory is the combination of a process and one or more mechanically controlled outputs. Measurements from the plant may include, but are not limited to, information received from sensors about the state of the system or control signals sent to other devices in the system. Input interface 604 provides measurement 621 to performance gradient probe 612 to detect the performance gradient. Actuator saturation compensator 614 then adjusts ESC loop 600 to compensate if an actuator saturation condition is present in plant 624. Manipulated variable updater 616 produces an updated manipulated variable 620 based upon the performance gradient and any compensation provided by actuator saturation compensator 614. In an exemplary embodiment, manipulated variable updater 616 includes an integrator to drive the performance gradient to zero. Manipulated variable updater 616 then provides an updated manipulated variable 620 to plant 624 via output interface 606.

Figure 4B:
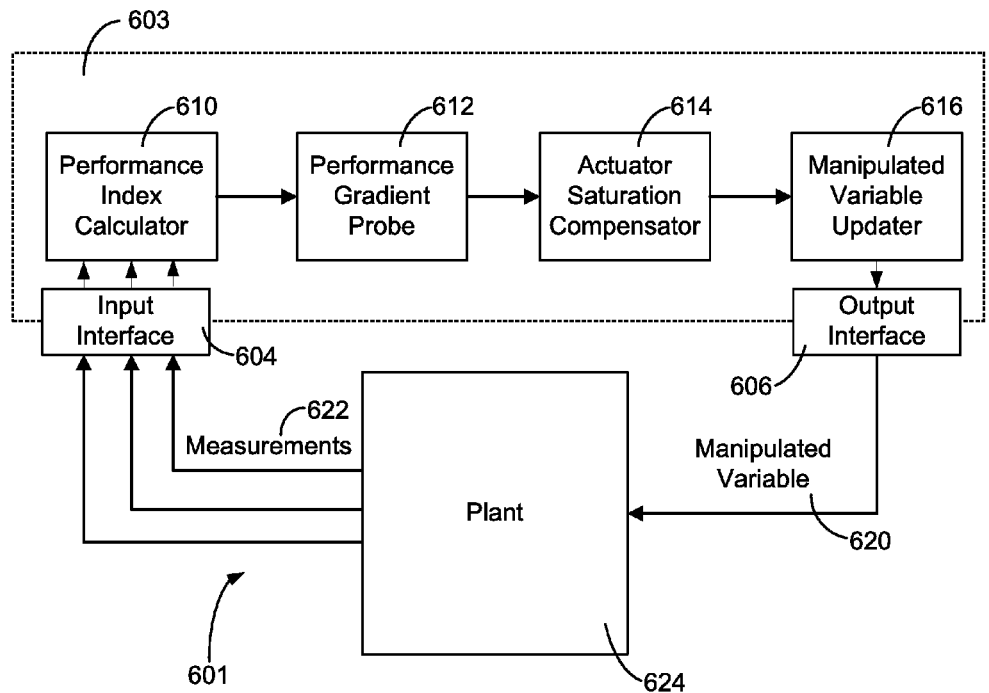
FIG. 4B is a block diagram of an extremum seeking control loop with a plurality of measurements and is configured to limit the effects of an actuator saturation condition, according to an exemplary embodiment.

Referring to FIG. 4B, a block diagram of an extremum seeking control loop with a plurality of measurements and configured to limit the effects of actuator saturation is shown, according to an exemplary embodiment. ESC loop 601 contains many of the functions and structures of ESC loop 600 (FIG. 4A), but utilizes a plurality of measurements 622 to determine a performance index. Controller 603 receives measurements 622 from plant 600 via input interface 604. A performance index is calculated by performance index calculator 610 using measurements 622. The performance index is a mathematical representation of the system performance of ESC loop 601 using measurements 622. Performance gradient probe 612 receives the performance index from performance index calculator 610 to detect the performance gradient. Actuator saturation compensator 614 then adjusts ESC loop 601 if an actuator saturation condition is present in plant 624. Manipulated variable updater 616 produces an updated manipulated variable 620 based upon the performance gradient and any compensation provided by actuator saturation compensator 614. In an exemplary embodiment, manipulated variable updater 616 includes an integrator to drive the performance gradient to zero. Manipulated variable updater 616 then provides an updated manipulated variable 620 to plant 624 via output interface 606.

Figures 5A, 5B:
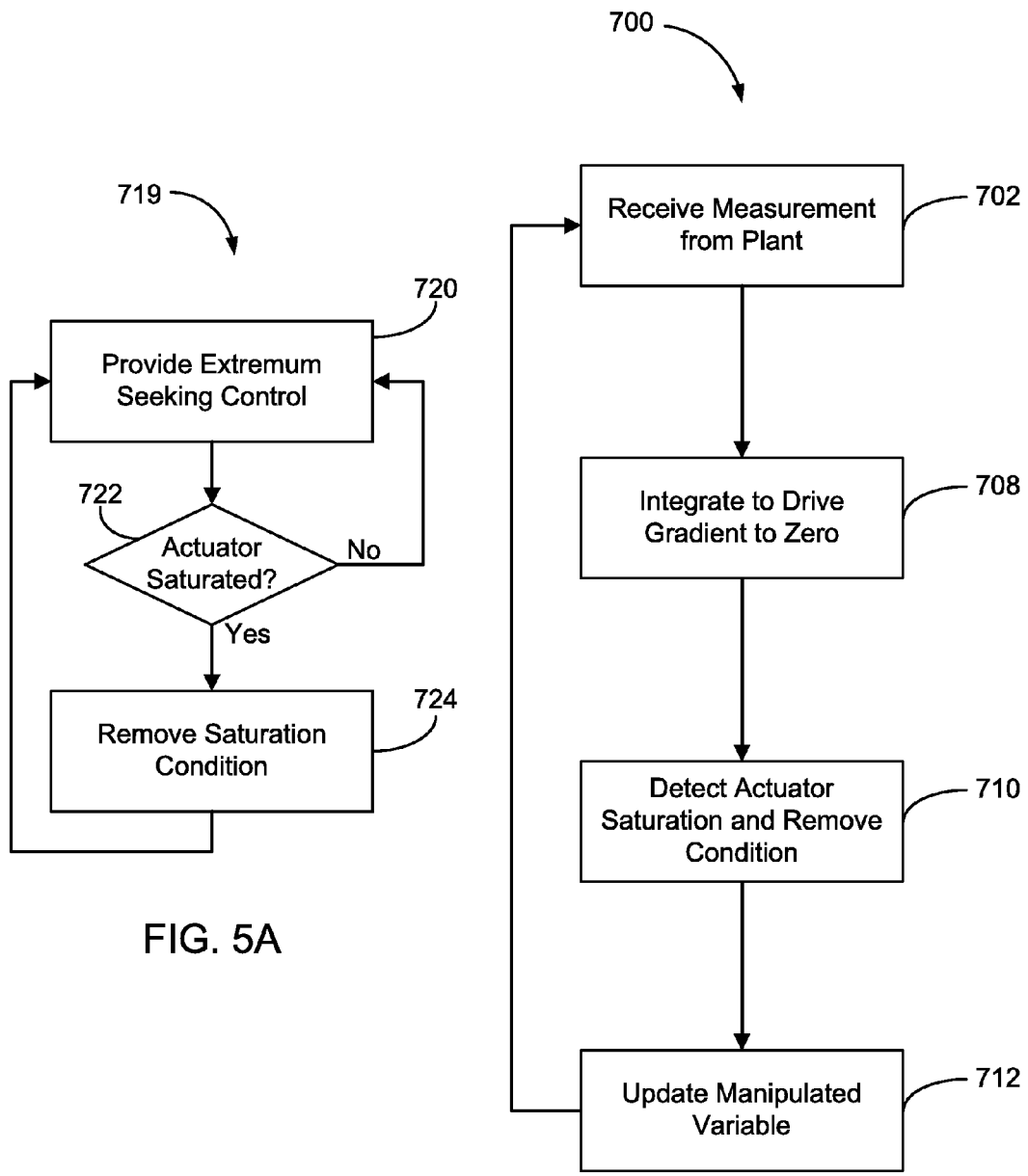
FIG. 5A is a flow diagram of a process for limiting the effects of an actuator saturation condition in an extremum seeking control loop by distinguishing between a state in which the actuator is saturated and a state in which the actuator is not saturated, according to an exemplary embodiment.
FIG. 5B is a flow diagram of a process for preventing and/or limiting the effects of an actuator saturation condition in an extremum seeking control loop, according to an exemplary embodiment.

Referring to FIG. 5A, a flow diagram is shown of a process 719 for limiting the effects of an actuator saturation condition in an ESC loop, according to an exemplary embodiment. In this embodiment, extremum seeking control is provided to a plant in step 720. During extremum seeking control, the ESC controller distinguishes between a state in which the actuator is saturated and a state in which the actuator is not saturated (step 722). In an exemplary embodiment, step 722 can be achieved by comparing the manipulated variable designated by the extremum seeking control strategy to a range of control signals that correspond to the physical range of actuator positions. For example, the extremum seeking controller may contain a memory module that stores information on the physical limits of the actuator. In another exemplary embodiment, the controller can be configured to receive input data from a position sensor that provides data on the position of the actuator to detect an actuator saturation condition. If an actuator saturation condition is detected, the saturation condition is removed and the control loop is updated (step 724). The saturation condition can be removed by reducing the control parameters sent to the actuator to those within the range corresponding to the physical limits of operation for the actuator. Alternatively, the control system can be turned off for a period of time if an actuator saturation condition is detected. Turning the control system off and on again can have the effect of reinitializing the ESC loop, thereby preventing the integrator from continuing to wind up.

FIG. 5B is a flow diagram of a process 700 for preventing and/or limiting the effects of an actuator saturation condition of an ESC loop. Process 700 is shown to include receiving a measurement from the plant (step 702). A plant in control theory is the combination of a process and an actuator. In an exemplary embodiment, the algorithm for the extremum seeking system utilizes a single input measurement from the plant. The algorithm may also have a plurality of input measurements. In an exemplary embodiment for an HVAC system, measurements may include inputs from temperature sensors, humidity sensors, air flow sensors, damper positioning sensors or may reflect power consumption. Process 700 is further shown to include probing for a performance gradient (step 706). In an exemplary embodiment, probing for a performance gradient may entail using a dither signal and demodulation signal in the closed-loop system to determine the performance gradient. Process 700 further includes utilizing an integrator to drive the performance gradient to zero (step 708). An actuator saturation condition is then detected and the condition is removed (step 710), altering the manipulated variable that is passed to the plant (step 712).

Figure 5C:
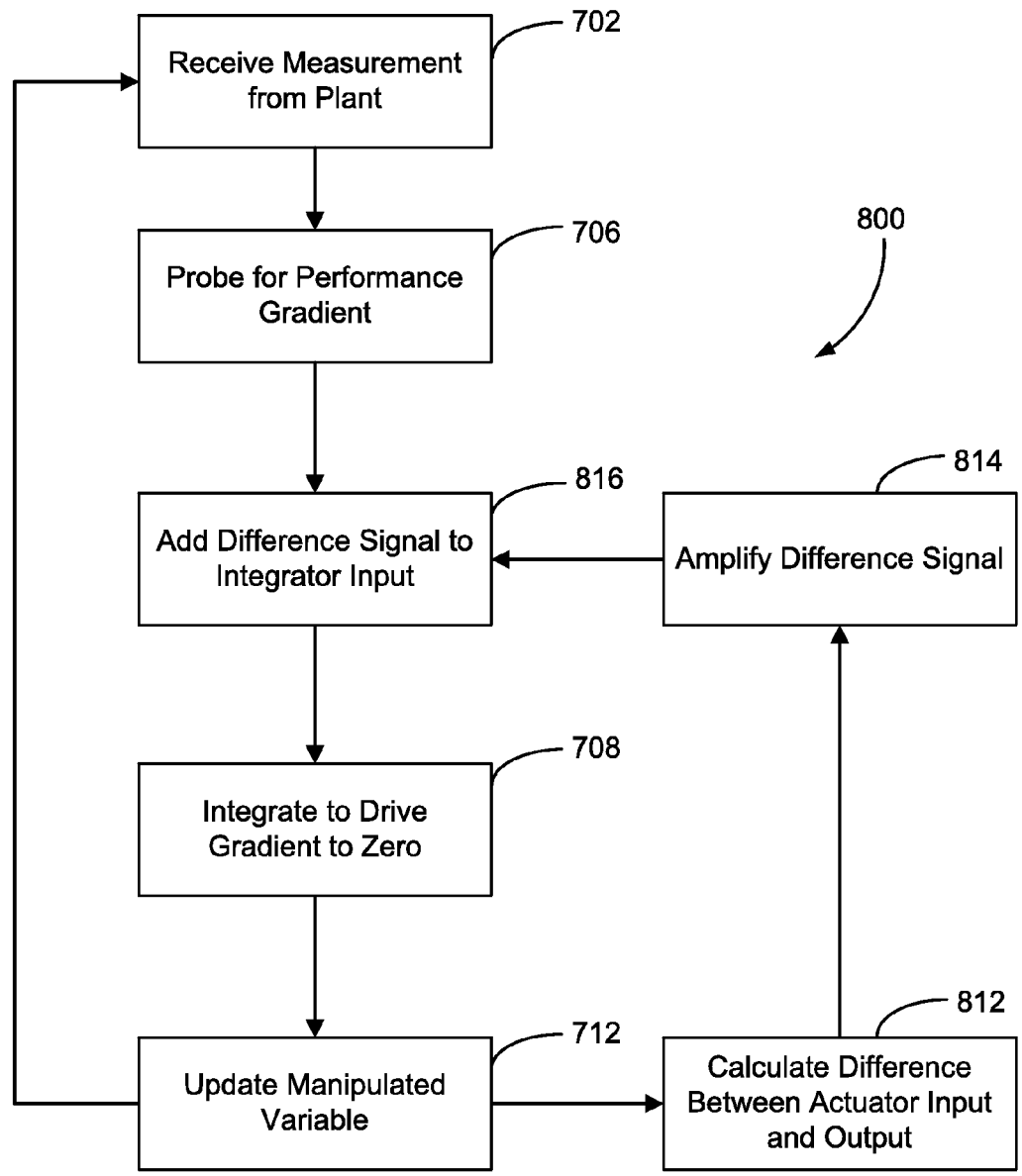
FIG. 5C is a flow diagram of a process for limiting the effects of an actuator saturation condition of an extremum seeking control loop using feedback from the actuator, according to an exemplary embodiment.

In FIG. 5C, a flow diagram of a process 800 for limiting the effects of an actuator saturation condition of an ESC loop using feedback from the actuator is shown, according to an exemplary embodiment. In this embodiment, no logical determination is necessary to detect the presence of an actuator saturation condition because a feedback loop automatically corrects for this condition. Process 800 includes the steps characteristic of an extremum seeking controller including: receiving a measurement from the plant (step 702), probing for a performance gradient (step 706), using an integrator to drive the gradient to zero (step 708) and updating the manipulated variable to the plant (step 712). Steps 702, 706, 708 and 712 can be performed in the same manner as outlined for process 700 in FIG. 5B. Process 800 further includes calculating the difference between the input and output signals to the actuator (step 812). The difference between the input and output signals to the actuator remains zero unless the actuator is saturated. Process 800 is further shown to pass the resulting difference signal from step 812 into an amplifier (step 814). The amplified difference signal from step 812 is then passed back to step 708 and combined with the output of step 706 to form a new input to the integrator of step 708 (step 816). This prevents the integrator in step 708 from winding up and the extremum system from becoming unable to adapt to changes in the optimum operating condition.

Figure 6:
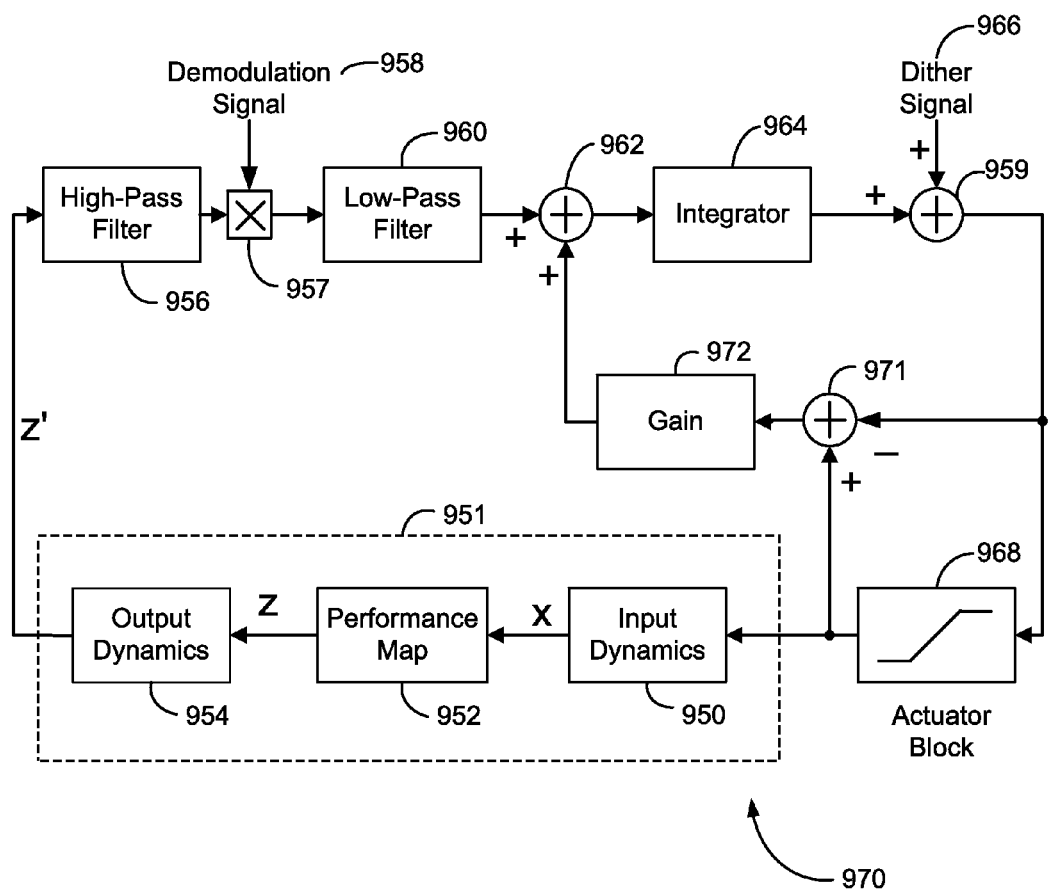
FIG. 6 is a diagram of a filtering extremum seeking control loop configured with a feedback loop to limit the effects of an actuator saturation condition, according to an exemplary embodiment.

In FIG. 6, a filtering ESC loop 970 configured to limit the effects of an actuator saturation condition is shown, according to an exemplary embodiment. Filtering extremum seeking controls determine a performance gradient through the use of a high-pass filter, a demodulation signal, a low-pass filter, and a dither signal. An integrator is used to drive the performance gradient to zero in order to optimize the closed-loop system. In an exemplary embodiment, filtering ESC loop 970 utilizes a feedback loop in order to limit the effects of an actuator saturation condition. Plant 951 can be represented mathematically as a combination of linear input dynamics 950, nonlinear performance map 952, and linear output dynamics 954. The actual mathematical model for plant 951 does not need to be known in order to apply ESC and is illustrative only. Input dynamics 950 produce a function signal 'x' which is passed to nonlinear performance map 952. The output of the performance map 952 is then passed to output dynamics 954 to provide an output signal 'z'. ESC loop 970 seeks to find a value for 'x' that minimizes the output of the performance map 952, thereby also minimizing output signal 'z'. As an illustrative example only, output signal 'z' may be represented as the expression:

$$z = f(x) = (x - x_{opt})^2 + 2$$

where f(x) represents the performance map and $x_{opt}$ represents the value at which f(x) is minimized. The actual representative formula of a performance map in an ESC loop is system and application specific. Output signal 'z' is passed through linear output dynamics 954 to produce signal "z'", which is received by the extremum seeking controller.

A performance gradient signal is produced by first perturbing the system by adding dither signal 966 to ESC loop 970 at processing element 959. The return signal "z'" is then used to detect the performance gradient through the use of high-pass filter 956, a demodulation signal 958 combined with (e.g., multiplied by) the output of high-pass filter 956 at processing element 957, and low-pass filter 960. The performance gradient is a function of the difference between 'x' and '$x_{opt}$'. The gradient signal is provided as an input to integrator 964 to drive the gradient to zero, thereby optimizing ESC loop 970.

Feedback from actuator block 968 has been added to ESC loop 970 to limit the effects of an actuator saturation condition. The difference between the input and output signals for the actuator controlled by ESC loop 970 is calculated at processing element 971. Actuator block 968 is representative of the input and output signals for the actuator. In an exemplary embodiment, processing element 971 computes the difference between the signal sent to the actuator and a measurement taken at the actuator that is indicative of the physical output of the actuator. The difference signal produced by processing element 971 is then amplified by a gain 972 and added to the input of integrator 964 at processing element 962, thereby limiting the input to integrator 964 and preventing the integrator from winding up. In another exemplary embodiment, processing element 971 is implemented as software and compares the signal outputted to the actuator to a stored range of values corresponding to the physical limits of the actuator.

Figure 7:
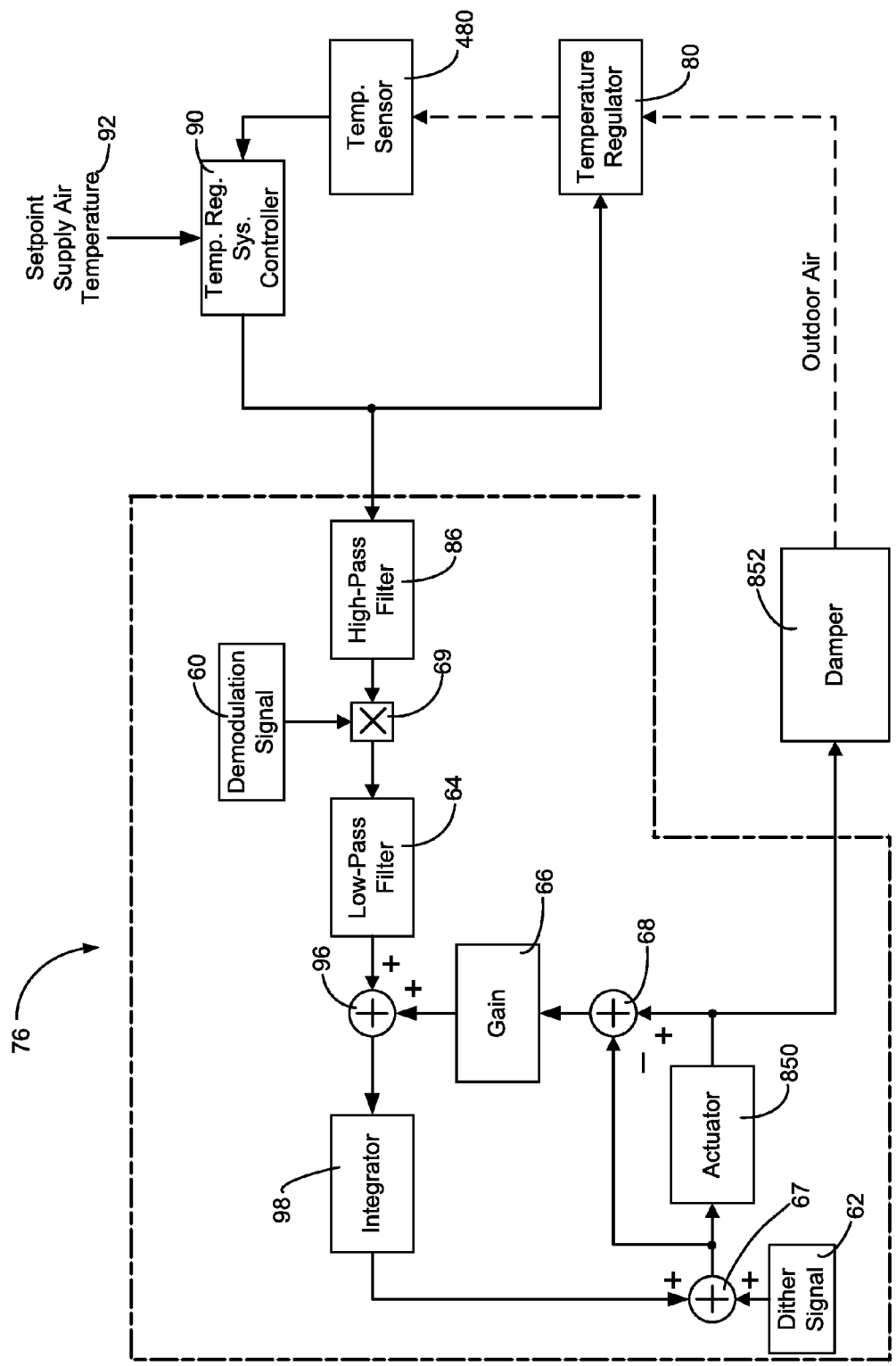
FIG. 7 is a diagram of an extremum seeking control loop for controlling an AHU, according to an exemplary embodiment.

In FIG. 7, an ESC loop 76 to control an AHU is shown, in an exemplary embodiment. ESC loop 76 has been adapted to compensate for an actuator saturation condition using feedback from actuator 850. The AHU includes a temperature regulator 80, a temperature regulator system controller 90, a damper actuator 850 and damper 852. Temperature regulator 80 may be any mechanism used to alter air temperature. This may include, but is not limited to, cooling coils, heating coils, steam regulators, chilled water regulators or air compressors. In an exemplary embodiment, temperature regulator 80 lowers the temperature of the air. Temperature regulator system controller 90 maintains a supply air temperature at a setpoint 92 by adjusting the position of chilled water valve 446 of cooling coil 444 (FIG. 2). Actuator 850 maintains the damper 852 to provide between 0% and 100% outside air.

A control loop consisting of temperature regulator system controller 90, temperature regulator 80, and temperature sensor 480 controls the amount of mechanical cooling in the AHU, according to an exemplary embodiment. Temperature regulator system controller 90 receives a setpoint supply air temperature 92 from a supervisory controller 404 (FIG. 2), according to an exemplary embodiment. Temperature regulator system controller 90 also receives measurements from temperature sensor 480, which measures the temperature of the air supplied by the AHU to the building. Temperature regulator system controller 90 compares the setpoint temperature to the measured temperature and adjusts the amount of mechanical cooling provided by temperature regulator 80 to achieve the setpoint supply air temperature 92.

ESC loop 76 is connected to the temperature regulator control loop in order to control damper 852, which regulates the amount of outdoor air into the AHU. In an exemplary embodiment, ESC loop 76 determines an optimum setting for actuator 850 in order to maximize the use of outdoor air for cooling, thereby minimizing the power consumption of the temperature regulator 80. The performance gradient for ESC loop 76 is detected through the combination of a dither signal 62 added to ESC loop 76 at processing element 67, high pass filter 86, a demodulator 69 that uses demodulation signal 60, and low pass filter 64. Integrator 98 serves to drive the detected gradient to zero. Control parameters from integrator 98 are passed on to actuator 850 to regulate damper 852, thereby controlling the amount of outside air utilized by the AHU. The outside air and/or air from other sources (e.g. return air) is combined with the air treated by temperature regulator 80 and provided to the zone serviced by the AHU. Temperature sensor 480 measures the air supplied by the AHU and provides temperature information to temperature regulator system controller 90.

The effects of an actuator saturation condition in ESC loop 76 are limited using feedback from the input and output signals to actuator 850. The difference between the input and output signals to actuator 850 is calculated by processing element 68. The difference signal that results from the operation at processing element 68 remains zero unless the damper actuator 850 becomes saturated. The difference signal is then amplified by amplifier 66 and fed back into the input of integrator 98 at processing element 96, thereby limiting the input to integrator 98 and preventing integrator 98 from winding up. Preventing integrator windup also prevents ESC loop 76 from becoming unable to adapt to changes in the optimal setting for actuator 850. It should be appreciated that the functions of ESC loop 76 can be implemented as an electronic circuit or as software stored within a digital processing circuit.

Figure 8:
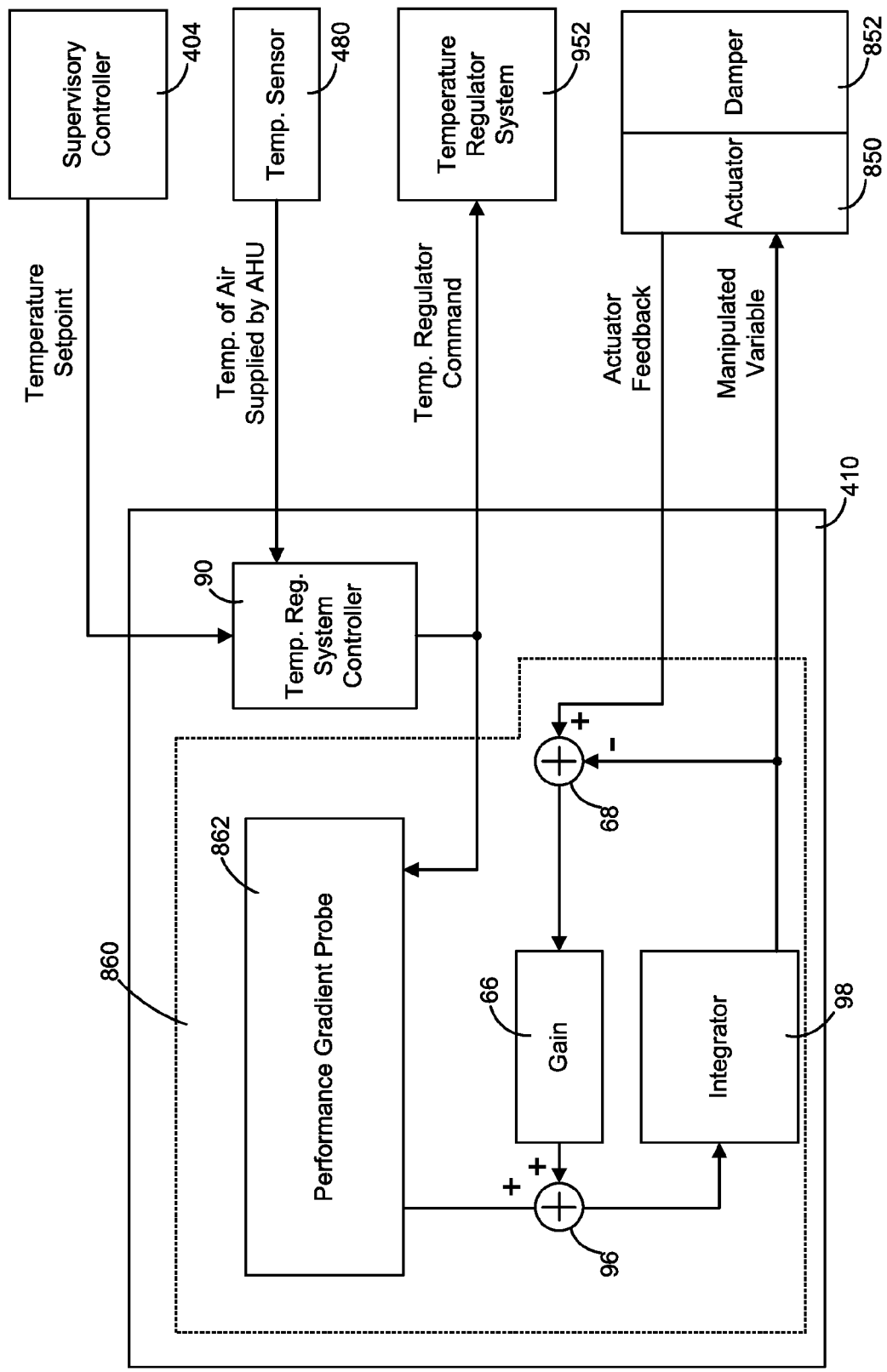
FIG. 8 is a diagram of a control system for an AHU configured to limit the effects of an actuator saturation condition, according to an exemplary embodiment.

Referring now to FIG. 8, a diagram of a control system for an AHU configured to limit the effects of an actuator saturation condition is shown, according to an exemplary embodiment. AHU controller 410 receives a temperature setpoint from supervisory controller 404. The temperature setpoint is used to drive a control loop including a temperature regulator system controller 90, a temperature regulator system 952 and a temperature sensor 480. Temperature regulator system controller 90 compares the temperature measured by temperature sensor 480 to that of the setpoint temperature provided by supervisory controller 404. A temperature regulator command signal is then sent from control 90 to temperature regulator system 952 to provide mechanical heating or cooling to drive the temperature of the air supplied by the AHU to that of the setpoint.

AHU controller 410 also contains an ESC loop 860 to control the position of outdoor air damper 852 via actuator 850. ESC loop 860 is coupled to the temperature regulator control loop in order to minimize the power consumption of the temperature regulator system 952. In an exemplary embodiment, ESC loop 860 searches for a setting for the damper opening that minimizes the power consumed by temperature regulator system 952 by making use of outdoor air. A performance gradient probe 862 detects a difference between the optimal settings for damper 852 and the current settings for damper 852. In an exemplary embodiment, performance gradient probe 862 utilizes a high pass filter, a demodulation signal, a low pass filter and a dither signal to detect the performance gradient. Integration of the gradient produces an actuator command signal to drive the actuator 850 to its optimal setting. Actuator 850 receives the actuator command signal and regulates damper 852, controlling the flow of outside air into the AHU.

The effects of an actuator saturation condition are limited in AHU controller 410 by computing the difference between the actuator command signal sent from integrator 98 and the output of actuator 850. The output of actuator 850 is fed back to ESC loop 860 and combined with the actuator command signal at element 68. Element 68 performs the mathematical operation of subtracting the actuator command signal from the actuator feedback signal. The difference signal produced by element 68 is then amplified by a gain at amplifier 66 and added to the input to integrator 98 at processing element 96. If the damper actuator 850 is saturated, the difference signal is nonzero, limiting the input to integrator 98 to prevent integrator windup.

Figure 9:
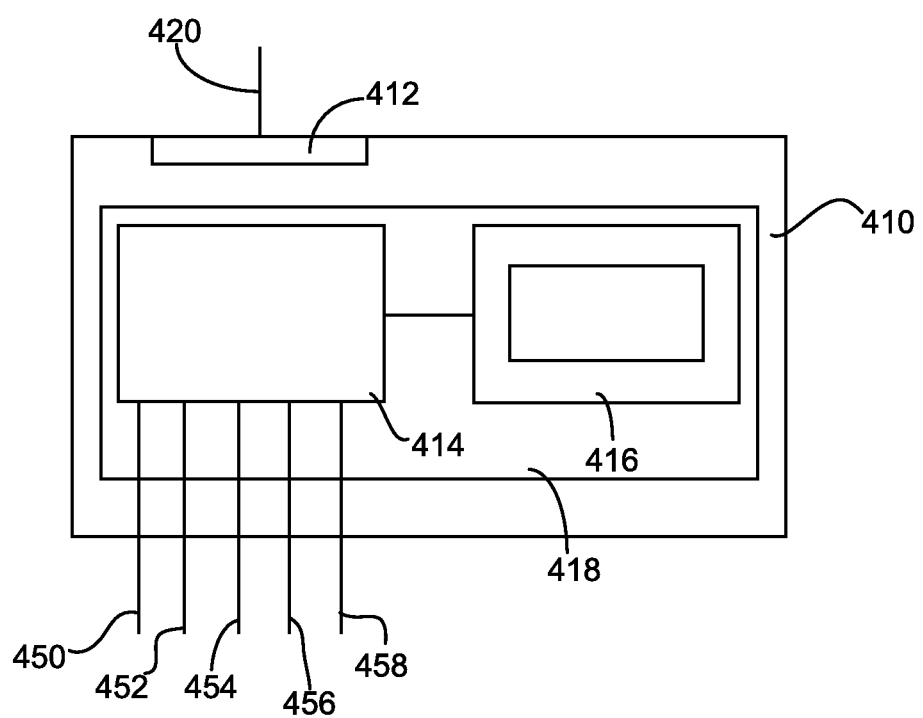
FIG. 9 is a block diagram of the controller shown in FIG. 8, according to an exemplary embodiment.

Referring to FIG. 9, a block diagram of the controller 410 in FIG. 8 is shown, according to an exemplary embodiment. Controller 410 is shown to include a processing circuit 418. Processing circuit 418 is shown to include processor 414 and memory 416. Processing circuit 418 may be communicably coupled with fan control output 456, chilled water valve output 454, heating valve output 452, actuator command 458, temperature input 450 and communications port 412. According to various exemplary embodiments, processing circuit 418 may be a general purpose processor, an application specific processor, a circuit containing one or more processing components, a group of distributed processing components, a group of distributed computers configured for processing, etc. Processor 414 may be or include any number of components for conducting data processing and/or signal processing.

Memory 416 (e.g., memory unit, memory device, storage device, etc.) may be one or more devices for storing data and/or computer code for completing and/or facilitating the various processes described in the present disclosure, including that of using extremum seeking logic to control an AHU. Memory 416 may include a volatile memory and/or a non-volatile memory. Memory 416 may include database components, object code components, script components, and/or any other type of information structure for supporting the various activities described in the present disclosure. According to an exemplary embodiment, any distributed and/or local memory device of the past, present, or future may be utilized with the systems and methods of this disclosure. According to an exemplary embodiment, memory 416 is communicably connected to processor 414 (e.g., via a circuit or other connection) and includes computer code for executing one or more processes described herein. Memory 416 may include various data regarding the operation of a control loop (e.g., previous setpoints, previous behavior patterns regarding energy used to adjust a current value to a setpoint, etc.).

In an exemplary embodiment, the functions of controller 410, as depicted in FIG. 8, may be implemented as software stored within memory 416 of processing circuit 418. Supervisory controller 404 provides a setpoint to controller 410 through communication port 412. Temperature sensor 480 (FIG. 8) provides temperature input 450 to controller 410, which compares the measured temperature to the setpoint temperature. In an exemplary embodiment, a temperature regulator command is sent to chilled water valve output 454 to cool the air within the AHU. Extremum seeking control strategy 860 can be used to control actuator 850 for damper 852 via actuator command 458. In an exemplary embodiment, feedback from the actuator can be achieved through the use of a physical signal received from a damper position sensor. In another exemplary embodiment, memory 416 can store information on the physical limits for actuator 850 to detect an actuator saturation condition. In yet another exemplary embodiment, detection of an actuator saturation condition may cause the input to the integrator 98 to be limited (FIG. 8).

Figure 10:
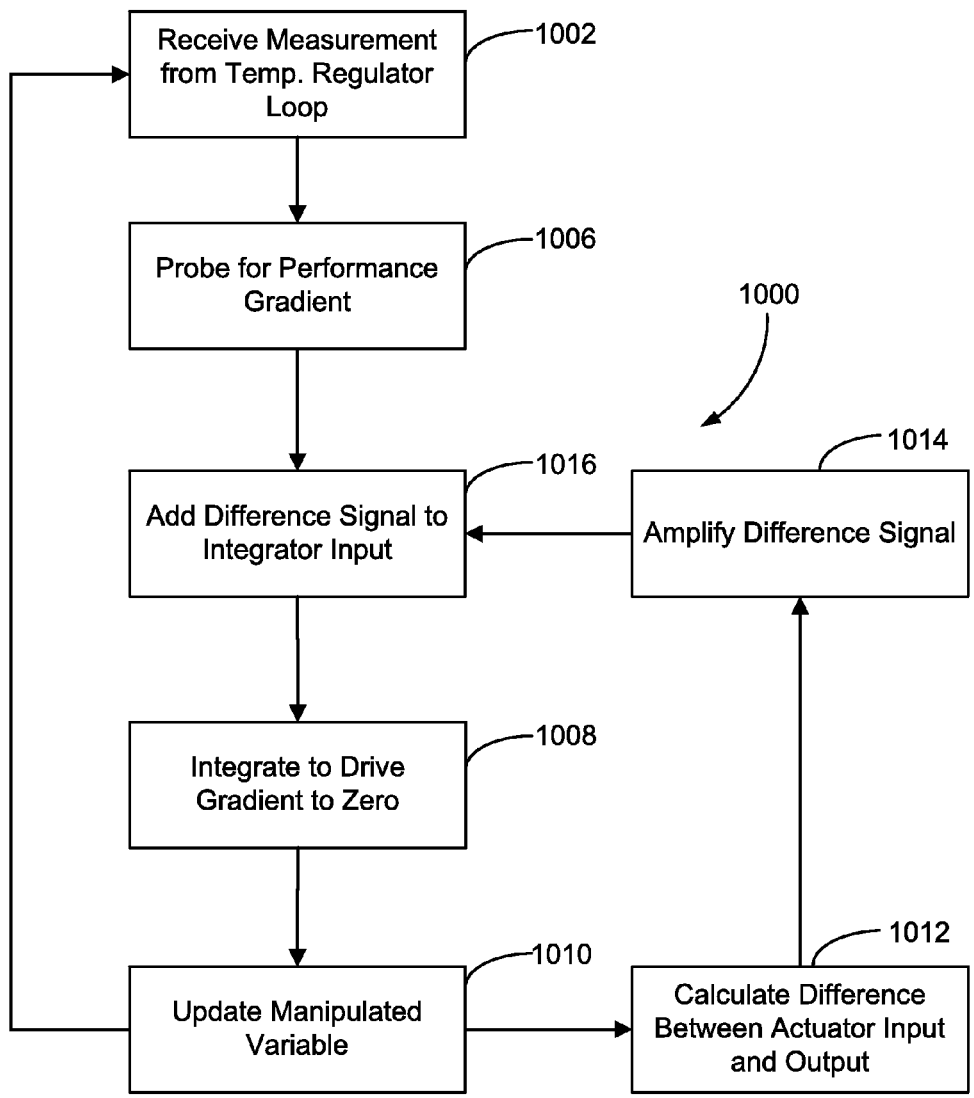
FIG. 10 is a flow diagram of a process for limiting the effects of an actuator saturation condition in an extremum seeking control loop for an AHU, according to an exemplary embodiment.

In FIG. 10, a flow diagram of a process 1000 for limiting the effects of an actuator saturation condition in an extremum seeking control loop for an AHU is shown, according to an exemplary embodiment. In an exemplary embodiment, process 1000 can be implemented as software stored within the memory of AHU controller 410. In another exemplary embodiment, process 1000 can be implemented as an analog circuit. Process 1000 includes the steps characteristic of an extremum seeking control strategy including: receiving a measurement from the temperature regulator control loop (step 1002), probing for a performance gradient (step 1006), using an integrator to drive the gradient to zero (step 1008) and updating the manipulated variable sent to the damper actuator (step 1010). Process 1000 further includes calculating the difference between the input and output signals to the actuator (step 1012). The difference between the input and output signals to the actuator remains zero unless the actuator is saturated. Process 1000 is further shown to pass the resulting difference signal from step 1012 into an amplifier (step 1014). The amplified difference signal from step 1014 is then passed back to step 1008 and combined with the output of step 1006 to form a new input to step 1008. This prevents the integrator in step 1008 from winding up and the extremum system from becoming unable to adapt to changes in the optimum operating condition.

Figure 11A:
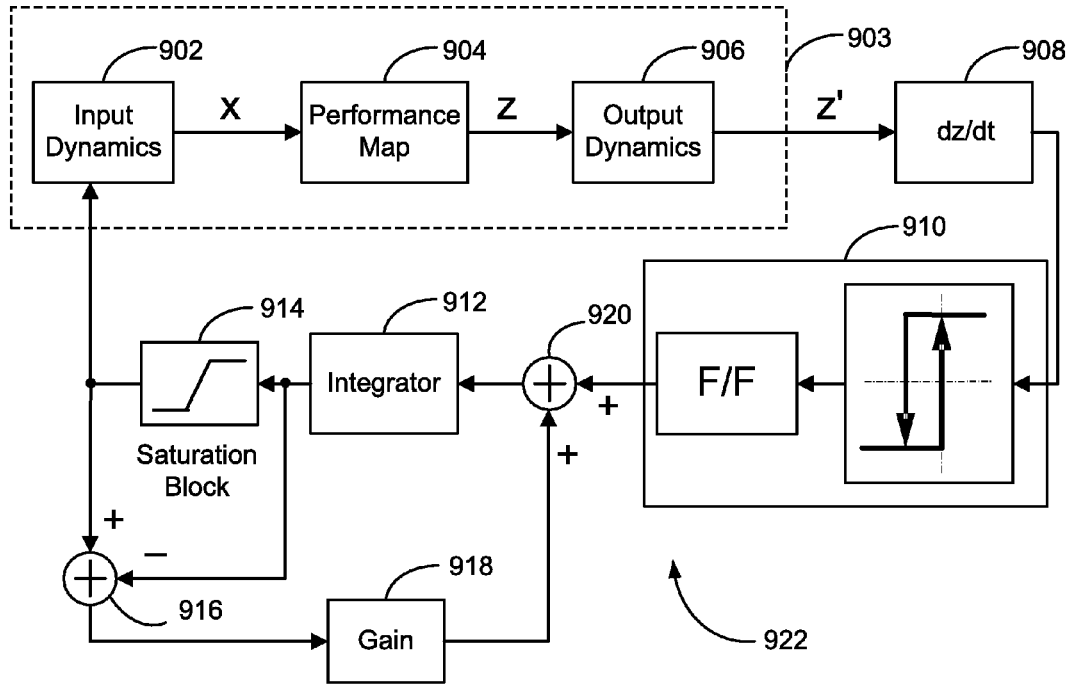
FIG. 11A is a diagram of a switching ESC loop configured to limit the effects of an actuator saturation condition, according to an exemplary embodiment.
Figure 11B:
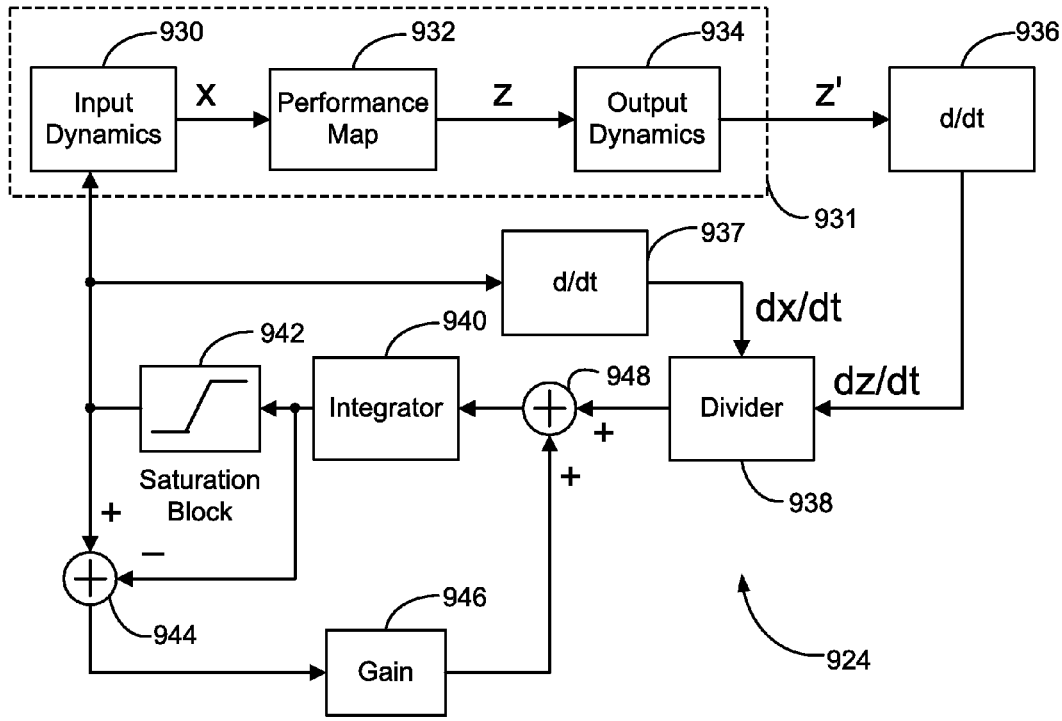
FIG. 11B is a diagram of a self-driving ESC loop configured to limit the effects of an actuator saturation condition, according to an exemplary embodiment.

Referring to FIGS. 11A-B, alternative extremum seeking control strategies are shown utilizing actuator feedback to minimize the effects of an actuator saturation condition. The feedback loops are configured to compute a difference between an actuator input and output, amplify the difference and then feed the amplified signal back into the input to an integrator. One skilled in the art would appreciate that the structures and functions listed herein could be implemented via software or as an electronic processing circuit. For example, integration of a signal can be achieved through the use of a microprocessor running software or through an integrator circuit using an op-amp.

In FIG. 11A, a switching ESC loop 922 configured to limit the effects of an actuator saturation condition is shown, according to an exemplary embodiment. A switching ESC loop utilizes a flip-flop to provide a signal to an integrator and the integrator drives this signal to zero in order to optimize the system. The presence of the integrator can result in a windup condition if the actuator controlled by the ESC becomes saturated. In an exemplary embodiment, switching ESC loop 922 has been configured with a feedback loop to limit the effects of an actuator saturation condition. ESC loop 922 controls plant 903, the plant being mathematically represented by linear input dynamics 902, nonlinear performance map 904, and linear output dynamics 906. Input dynamics 902 produce a function signal 'x' which is passed to nonlinear performance map 904. The output of the performance map 904 is then passed to output dynamics 906 to provide an output signal 'z'. Output signal 'z' is modified by output dynamics 906 to produce a return signal 'z'' to the extremum seeking controller. ESC loop 922 seeks to find a value for 'x' that minimizes the output of performance map 904, thereby also minimizing output signal 'z'. As an illustrative example only, output signal 'z' may be represented as the expression:

$$z = f(x) = (x - x_{opt})^2 + 2$$

where f(x) represents the performance map and $x_{opt}$ represents the value at which f(x) is minimized. The derivative of 'z' is then taken with respect to time at differentiator 908 and used as an input to a flip-flop based control 910 with some hysteresis. The flip-flop of circuit 910 is configured such that the change over associated with a negative value of the output derivative causes the flip-flop to change states. In one embodiment, a J-K flip-flop can be used with the hysteresis output driving the clock of the flip-flop. The output of circuit 910 is then integrated by integrator 912 and fed to the actuator of plant 903. Saturation block 914 mathematically represents the actuator of plant 903 with an input corresponding to the manipulated variable produced by ESC loop 922 and an output corresponding to the output of the actuator.

The effects of an actuator saturation condition at saturation block 914 are limited through the use of a feedback loop. The difference between the input and output signals for saturation block 914 is calculated at processing element 916. The difference signal is then amplified by a gain 918 and combined with the input to integrator 912 at processing element 920 to prevent wind-up in integrator 912.

Referring next to FIG. 11B, a self-driving ESC loop 924 configured to limit the effects of an actuator saturation condition is shown, according to an exemplary embodiment. Self-driving ESCs operate by first determining a gradient signal. The gradient signal in a self-driving ESC loop is calculated by dividing the derivative of the input to the performance map with respect to time by the derivative of the output of the system's output characteristics with respect to time. An integrator is then used to drive the gradient to zero in order to optimize the closed-loop system. In an exemplary embodiment, self-driving ESC loop 924 has been configured with a feedback loop to limit the effects of an actuator saturation condition. ESC loop 924 contains plant 931, mathematically represented as a combination of linear input dynamics 930, nonlinear performance map 932, and linear output dynamics 934. Similar to FIG. 9A, input dynamics 930 receive a manipulated variable from the extremum seeking controller to produce a signal 'x', which is used as an input to performance map 932. ESC loop 924 seeks to produce a value for 'x' which minimizes the output 'z' of performance map 932. The output 'z' of performance map 932 passes through output dynamics 934 to produce return signal 'z'', which is measured by the extremum seeking controller. The derivative of signal 'z'' with respect to time is taken at differentiator 936 and provided to divider 938. The derivative of the manipulated variable sent to plant 931 with respect to time is taken at differentiator 937 and also provided to divider 938. Divider 938 produces a gradient signal corresponding to dz'/dx, which is provided as an input to integrator 940 in order to drive the gradient to zero. The effects of an actuator saturation condition are limited using a feedback loop. Similar to saturation block 914 (FIG. 11A), saturation block 942 mathematically represents the actuator of plant 931 with an input corresponding to the manipulated variable produced by ESC loop 924 and an output corresponding to the output of the actuator. The difference between the input and output signals for the actuator is calculated at processing element 944. The difference signal is then amplified by a gain 946 and combined with the input to integrator 940 at processing element 948 to prevent wind-up in integrator 940.

The construction and arrangement of the systems and methods as shown in the various exemplary embodiments are illustrative only. Although only a few embodiments have been described in detail in this disclosure, many modifications are possible. All such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The actuator saturation control described in the present application could be applied to many different HVAC setups. For example, one or a plurality of dampers may be used to control airflow throughout and/or within the AHU. An extremum seeking control strategy can be used to control the one or more dampers to minimize power consumption by the AHU. Referring back to FIG. 2, the amount of air utilized to reduce power consumption by the AHU can be regulated by a combination of exhaust damper 460, recirculation air damper 462, and outdoor air inlet damper 464. For example, if $\theta_{ex}$, $\theta_{re}$, and $\theta_{out}$ represent the fraction of fully open position of dampers 460, 462, and 464, respectively, the damper positions can be interrelated as follows:

$$\theta_{re} = 1 - \theta_{ex}$$

$$\theta_{out} = 1 - \theta_{re} = \theta_{ex}$$

In this example, the relationship between the damper openings is such that ESC can be used to optimize the control of any damper, because optimization of one damper opening leads to the optimization of all damper openings.

In yet another exemplary embodiment, one or more dampers may have fixed positions while other damper openings are variable and interrelated. In this embodiment, the damper positions for dampers 460, 462, and 464 may be as follows:

$\theta_{out}=1$, $\theta_{ex}=$manipulated variable from the ESC, and
$\theta_{re}=1-\theta_{ex}$ In this example, the ESC is used to optimize the control of damper 460 to minimize the power consumption of the AHU, while outdoor air inlet damper 464 remains fully open and damper 462 varies based on damper 460. ESC can therefore be used to optimize any combination of fixed position dampers and interrelated variable position dampers in an AHU, where ESC is used to control one or more of the variable position dampers.

ESC can also directly control more than one damper at a time. For example, multiple ESC controllers may be used to control a plurality of independent dampers. Alternatively, a single ESC controller with multiple inputs can be used to regulate a plurality of independent dampers. The dampers in an AHU controlled by the extremum seeking control strategy may include, but are not limited to, outside air inlet dampers, recirculation air dampers, exhaust dampers, or a combination thereof.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures may show a specific order of method steps, the order of the steps may differ from what is depicted. Also two or more steps may be performed concurrently or with partial concurrence. Such variations will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for optimizing a control process for an actuator, the method comprising:
    operating the control process using an extremum seeking control strategy; and
    using an electronics circuit to compensate for an actuator saturation condition of the extremum seeking control strategy, wherein the step of compensating for actuator saturation control comprises:
        receiving a feedback signal representative of the actuator's accuracy relative to a control signal for the actuator;
        obtaining a difference signal between the control signal and the feedback signal;
        providing the difference signal to an input of the extremum seeking control strategy to override a previously determined control parameter of the extremum seeking control strategy.

2. The method as recited in claim 1, further comprising:
    amplifying the difference signal provided to the input of the extremum seeking control strategy;
    receiving the amplified difference signal at the input of the extremum seeking control strategy; and
    providing the amplified difference signal to an integrator configured to reduce a performance gradient.

3. A controller for controlling an actuator, the controller comprising:
    a processing circuit configured to operate the plant using an extremum seeking control strategy and to compensate for an actuator saturation condition of the extremum seeking control strategy;
    an input configured to receive a feedback signal from the actuator; and
    an output configured to send a control signal to the actuator;
    wherein the processing circuit is further configured to obtain a difference signal describing the difference between the feedback signal and the control signal and wherein the processing circuit is further configured to provide the difference signal to a portion of the processing circuit configured to provide the extremum seeking control strategy, the difference signal to override a previously determined of the extremum seeking control strategy.

4. The controller of claim 3, further comprising:
    amplifying the difference signal prior to providing the difference signal to the logic of the processing circuit for providing the extremum seeking control strategy.

5. The controller of claim 3, wherein the portion of the processing circuit configured to provide the extremum seeking control strategy comprises an integrator configured to reduce a performance gradient, and wherein the integrator is configured to receive the difference signal as an input.

6. The controller of claim 3, wherein the processing circuit is further configured to distinguish the actuator saturation condition from a state in which the actuator is not saturated.

7. The controller of claim 6, wherein the processing circuit is further configured to reset the extremum seeking control strategy when the actuator saturation condition is distinguished.

8. The controller of claim 3, wherein the processing circuit further comprises:
    memory storing physical boundary information for the actuator, wherein the processing circuit is configured to retrieve the physical boundary information from memory and to detect the actuator saturation condition using the retrieved physical boundary information.

9. The controller of claim 3, wherein the processing circuit comprises a processor and a memory device communicably coupled to the processor, the memory device storing computer code for operating the plant using the extremum seeking control strategy and computer code for compensating for the actuator saturation condition of the extremum seeking control strategy.

10. A controller for an air handling unit having an actuator that opens and closes a damper to control the amount of outdoor air used for cooling the air provided to a building space by the air handling unit, comprising:
- an input interface configured to receive a temperature sensor input;
- a temperature regulator control module configured to provide a command to a temperature regulator system configured to chill air provided by the air handling unit, wherein the temperature regulator control module determines the command based on the temperature sensor input received at the input interface;
- an extremum seeking control module configured to receive the command from the temperature regulator control module and comprising an integrator and a performance gradient probe, the performance gradient probe configured to use the received command to detect a difference between an estimated optimal position for the actuator and a current actuator position and to provide the detected difference to the integrator, wherein the integrator is configured to calculate an actuator command signal configured to reduce the detected difference;
- an output interface configured to provide the actuator command signal to the actuator; and
- a feedback interface configured to receive a feedback signal from the actuator representative of the actual position of the actuator after the actuator is adjusted in response to the actuator command signal;
- wherein the extremum seeking control module is further configured to determine an error between the actuator command signal and the feedback signal;
- wherein the extremum seeking control module is further configured to add the error to the detected difference provided to the integrator of the extremum seeking control module.

11. The controller of claim 10, wherein the addition of the error to the detected difference of the integrator is configured to reduce or change the sign of the detected difference provided to the integrator.

12. The controller of claim 11, wherein the estimated optimal position for the actuator is calculated to minimize the power consumption of the temperature regulator system by maximizing the use of outdoor air provided to the building by the damper.

13. The controller of claim 12, wherein the extremum seeking control module comprises a first processing element configured to determine the error between the actuator command signal and the feedback signal by subtracting the actuator command signal from the feedback signal.

14. The controller of claim 13, wherein the extremum seeking control module further comprises a second processing element configured to amplify the error by a gain to at least offset integrator windup.

15. The controller of claim 14, wherein the detected difference provided to the integrator of the extremum seeking control module is not affected by the second processing element when the error is zero.

* * * * *